United States Patent
Co

(10) Patent No.: US 6,584,576 B1
(45) Date of Patent: Jun. 24, 2003

(54) MEMORY SYSTEM USING COMPLEMENTARY DELAY ELEMENTS TO REDUCE RAMBUS MODULE TIMING SKEW

(75) Inventor: Ramon S. Co, Trabuco Canyon, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 0 days.

(21) Appl. No.: 09/439,792

(22) Filed: Nov. 12, 1999

(51) Int. Cl.[7] .............................. H04L 7/00; G06F 1/10
(52) U.S. Cl. ...................................................... 713/401
(58) Field of Search ................... 713/400, 401

(56) References Cited

U.S. PATENT DOCUMENTS

| | | | | |
|---|---|---|---|---|
| 5,426,771 A | * | 6/1995 | Asprey et al. | 711/118 |
| 5,796,673 A | * | 8/1998 | Foss et al. | 365/233 |
| 5,844,438 A | * | 12/1998 | Lee | 327/291 |
| 5,923,198 A | * | 7/1999 | Fujioka | 327/262 |
| 5,987,576 A | * | 11/1999 | Johnson et al. | 711/167 |
| 6,031,787 A | * | 2/2000 | Jeddeloh | 365/233 |
| 6,101,612 A | * | 8/2000 | Jeddeloh | 713/401 |
| 6,108,795 A | * | 8/2000 | Jeddeloh | 713/401 |
| 6,226,754 B1 | * | 5/2001 | Ware et al. | 713/400 |
| 6,226,757 B1 | * | 5/2001 | Ware et al. | 713/503 |

* cited by examiner

*Primary Examiner*—Thomas Lee
*Assistant Examiner*—Eric Chang
(74) *Attorney, Agent, or Firm*—Morland C. Fischer

(57) ABSTRACT

An improvement in a Rambus memory system of the type used in personal computers. On a module level, each RIMM (Rambus Interface Memory Module) includes a positive and a negative module time delay element on the CTM (clock to master) clock line. On a system level, where a motherboard has a plurality of RIMMs coupled to a chipset (i.e. memory controller), a positive or negative system time delay element is placed on the CFM (clock from master line). By virtue of the module and system time delay elements, the clock timing can be adjusted from the data timing, whereby the overall TQ (timing skew between clock and data) can be advantageously reduced to allow more RIMMs to be placed on the same motherboard. What is more, the module and system delays also improve timing margins on the standard Rambus channel so as to increase the robustness of a conventional Rambus system.

13 Claims, 2 Drawing Sheets

Setup and Hold Time TR

MEMORY SYSTEM USING COMPLEMENTARY DELAY ELEMENTS TO REDUCE RAMBUS MODULE TIMING SKEW

BACKGROUND OF THE INVENTION

1. Field of the Invention

This invention relates to a memory system for a computer which includes an array of RIMMs (Rambus Interface Memory Modules), time delay elements on the clock lines for the RIMMs, and a time delay element on the clock line for the motherboard on which the array of s are interconnected so as to allow the timing of clock signals to be adjusted independently from the timing of data signals with the advantage of allowing a relatively large number of memory modules to be located on the motherboard.

2. Background Art

Computer memory technology is available from Rambus, Inc. which incorporates arrays of memory modules known commercially as RIMMs (Rambus Interface Memory Modules). Such memory modules consist of chips known as RDRAMs (Rambus dynamic random access memories). Prior to the advent of the aforementioned RIMM memory module, memory speeds were limited to about 100 MHz. The ability to increase the speeds of CPUs in the computer field was hampered by the relatively slow memory speeds. However, RIMM memory modules are now capable of running at speeds of about 400 MHz which is more compatible with current CPU speeds.

Nevertheless, there exists an inherent timing limitation with conventional RIMM memory modules which can effect their reliability (e.g. as a consequence of noise, signal distortion, and the like) as well as the number of such modules that can be adequately supported on a motherboard and the number of applications that can be successfully performed thereby. More particularly, FIG. 1 of the drawings illustrates a conventional RIMM memory module 1 comprising a plurality of RDRAM memory elements 2-1, 2-2 . . . 2-N. Each memory element of the memory module 1 has respective contact pins that are connected at the system level to a plurality of signal paths including an address line (ADRS), a data bus line (DATA), a clock-from-master line (CFM), and a clock-to-master line (CTM).

Turning now to FIG. 2 of the drawings, there is shown a data eye diagram which is characteristic of the Rambus RIMM technology shown in FIG. 1. In this regard, there are three timing parameters that affect the performance of the standard Rambus channel:

TQ: timing skew between clock and data

TR: setup and hold time of the receiver (or input buffer)

ISI: channel intersymbol interference.

These parameters are related according to the following expression:

$$TQ+TR+ISI<T/2;$$

where T is the bit period.

The ideal time to sample data transmitted on the data line would be at the center of the data pulse (designated $t_0$ in FIG. 2). However, it may be appreciated that the clock pulse CL in FIG. 2 is generated leading to the left and lagging to the right of the center time line $t_0$. With the clock pulse leading to the left of time line $t_0$ (as shown), the timing skew TQ is a negative number. However, with the clock pulse lagging to the right of time line $t_0$, the timing skew will be positive.

At 800 Mbps, typical values of the aforementioned parameters (T=1,250 psec) are:

TQ=300 psec max

TR=200 psec max

ISI=125 psec max (for 3 memory slots)

Among these three parameters, TQ can be adjusted at the module level. TR is set by the receiver (input buffer) of the RDRAMs. ISI is set by the number of modules and the number of RDRAM devices per module. That is to say, ISI increases as more modules are placed on the Rambus motherboard.

There is a need in the industry to increase the number of memory modules that can be placed on the motherboard. This provides flexibility in upgrading the system memory as the need arises. In order to increase the number of modules on a Rambus based system, the parameters TQ and TR would have to be made smaller as the third parameter ISI increases with the number of modules. Since the parameter TR is set by the receiver and can not be controlled, it would be desirable to have available a relatively simple and accurate method to reduce the parameter TQ so as to overcome the timing limitation at both the Row module level and the system (motherboard) level.

SUMMARY OF THE INVENTION

In general terms, an improved Rambus memory system is disclosed for use in a personal computer. Each RIMM (Rambus Interface Memory Module) includes a plurality of RDRAMs that are selected so as to have substantially similar timing skews (TQ) between clock and data pulses. Each RDRAM is coupled to a plurality of signal paths including an address line, a data bus line, a clock from master (CFM) line, and a clock to master (CTM) line. According to the improvement of this invention on a module level, a first module time delay element is located in the CTM clock line at the output port thereof. A complementary module time delay element is also located in the CTM clock line at the input port. Either time delay can be positive or negative provided that the sum of the first and complementary module time delays equals 0.

A series of RIMMs are located on a motherboard and coupled to a chipset (i.e. memory controller) to which the address line, data bus line, and CFM and CTM clock lines are connected. According to the improvement of this invention on a system level, a positive or negative system time delay element is located in the CFM clock line at the input port thereof. Each of the module and system time delays herein disclosed can be implemented by making the CFM or CTM line traces shorter or longer than the data bus line trace.

By virtue of the foregoing, the clock timing can be adjusted from the data timing. Therefore, the overall system TQ can be reduced so as to provide larger timing margins in the TQ, TR and ISI parameters of the Rambus channel and greater tolerance against error. Accordingly, the Rambus system is made more reliable, whereby the motherboard can support a larger number of RIMMS to accomplish a wider variety of applications. Thus, the robustness of a conventional Rambus system may be increased.

DETAILED DESCRIPTION

Figure 3:
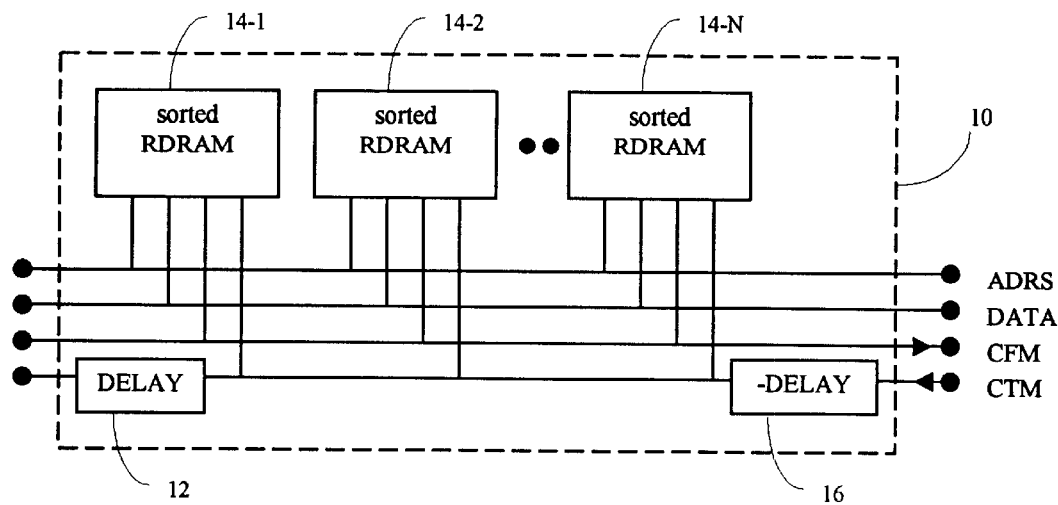
FIG. 3 is a block diagram representing a RIMM memory module including means to permit the clock timing to be adjusted from the data timing to avoid the timing limitations common to the Rambus memory module of FIG. 1.

FIG. 3 of the drawing shows a solution on a module level for overcoming the timing limitations inherent with the conventional RIMM technology from Rambus, Inc. In accordance with this first solution for a RIMM memory module 10, a first time delay element 12 (designated DELAY) is placed at the outgoing port of the CTM (clock to master) clock line. The first time delay element 12 may introduce either a positive or a negative time delay. This allows the clock timing to be adjusted relative to the data timing. Although the RDRAM Rambus memory elements 14-1, 14-2 . . . 14-N generate the data timing from the clock, the memory elements 14-1, 14-2 . . . 14-N generate timing error in the process. Thus, when the chipset from the motherboard reads the data from the memory modules, a timing error TQ exists between the data bus lines and the clock line.

A complementary time delay element 16 (designated—DELAY) is placed at the incoming port of the CTM clock line to offset the delay element 12 at the outgoing port. The complementary time delay element 16 may also introduce either a positive or a negative time delay provided that the sum of the time delays from delay elements 12 and 16 equals 0. This allows the clock and data signals from a downstream module to pass through module 10 without any timing skew.

As illustrated in FIG. 3, the RIMM module 10 including the first timing solution has a plurality of RDRAM memory elements 14-1, 14-2 . . . 14-N that are coupled together and sorted according to their characteristic timing skew TQ. If the clock timing leads the data timing, a positive time delay (corresponding to the TQ of the RDRAM) is applied to the delay element. If the clock timing lags the data timing, a negative time delay (corresponding to the TQ of the RDRAM) is applied to the delay element. If the clock timing is equal to the data timing, no time delay is applied.

A positive time delay is implemented by making the PCB traces on the CTM clock line longer than the data bus lines. A negative delay is implemented by making the PCB traces on the CTM clock line shorter than the data bus lines. There is no delay if the clock line is equal to the data bus lines.

The following example illustrates how the memory elements 14-1, 14-2 . . . 14-N are sorted. It is assumed that TQ can vary from −300 psec to +300 psec for the RDRAMs of module 10. A timing accuracy of +/−100 psec is desired for the modules. This can be accomplished by using 3 bins. RDRAMs with a TQ range of −300 psec to −101 psec (negative values indicate clock timing that leads data timing) are placed on Bin 1, RDRAMs with a TQ range of −100 psec to +100 psec are placed on Bin 2, and RDRAMs with a TQ range of +101 psec to +300 psec are placed on Bin 3. The RDRAMs on Bin 1 are used on PCB 1 wherein the clock line is longer than the data lines by 200 psec. The RDRAMs on Bin 2 are used on PCB 2 wherein the clock line is equal to the data lines. The RDRAMs on Bin 3 are used on PCB 3 wherein the clock line is shorter than the data lines by 200 psec.

The timing accuracy of the module can be further improved to +/−60 psec by using 5 bins. The binning of the RDRAMs are done according to the following:

| TQ Range | | Bin No. |
| --- | --- | --- |
| −300 psec to −181 psec | to | Bin 1 |
| −180 psec to −61 psec | to | Bin 2 |
| −60 psec to +60 psec | to | Bin 3 |
| +61 psec to +180 psec | to | Bin 4 |
| +181 psec to +300 psec | to | Bin 5 |

The RDRAMs on Bin 1 are used on PCB 1 wherein the clock line is longer than the data bus lines by 240 psec. The RDRAMs on Bin 2 are used on PCB 2 wherein the clock line is longer than the data bus lines by 120 psec. The RDRAMs on Bin 3 are used on PCB 3 wherein the clock line is equal to the data bus lines. The RDRAMs on Bin 4 are used on PCB 4 wherein the clock line is shorter than the data bus lines by 120 psec. The RDRAMs on Bin 5 are used on PCB 5 wherein the clock line is shorter than the data bus lines by 240 psec.

Figure 4:
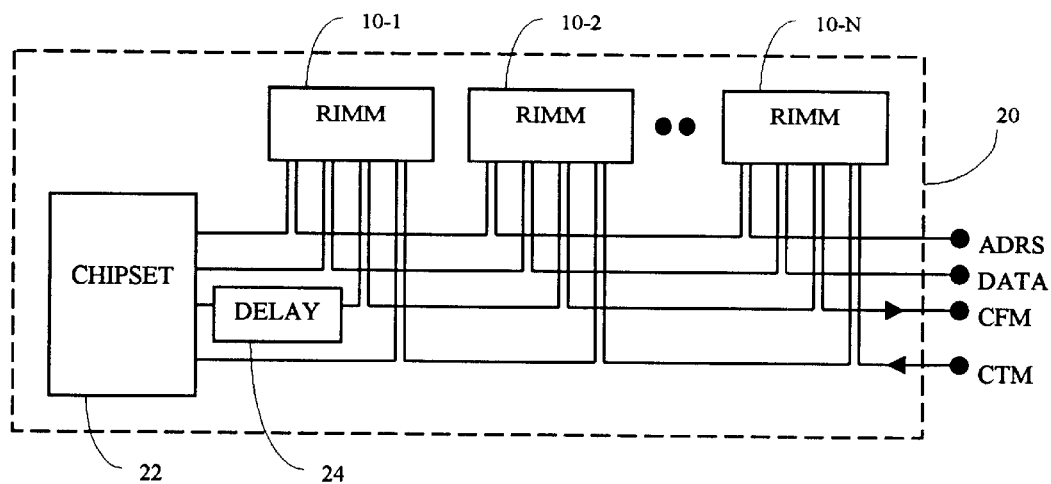
FIG. 4 is a block diagram representing a system wherein a relatively large number of the RIMM memory modules of FIG. 3 may be located on a motherboard to perform a variety of different applications.

FIG. 4 of the drawings shows a solution on a system level for overcoming the timing limitations common to RIMM technology so that a series of the improved RIMM memory modules 10-1, 10-2 . . . 10-N of FIG. 3 are daisy chained together on a Rambus motherboard 20 having a conventional Rambus chipset or memory controller 22 which functions as the master. In this case, a system time delay element 24 is placed at the incoming port of the CFM (clock from master) clock line. The chipset 22 routes the CTM (clock to master) line to the CFM line. The time delay element 24 allows the system clock timing to be adjusted relative to the data timing generated from the chipset. Although the chipset generates the data timing from the CTM clock, the chipset generates a timing error in the process. Thus, when the chipset writes data to the RID modules, a timing error TQ exists between the data lines and the clock line.

The timing skew TQ of the chipset is first determined. If the clock timing leads the data timing, a positive time delay (corresponding to the TQ of the chipset) is introduced by the system time delay element 24. If the clock timing lags the data timing, a negative time delay (corresponding to the TQ of the chipset) is introduced by the time delay element 24. If the clock timing is equal to the data timing, no time delay is introduced.

A positive time delay can be implemented by making the PCB traces on the clock line longer than the data bus lines. A negative time delay can be implemented by making the PCB traces on the clock line shorter than the data lines. There is no time delay when the clock line is equal to the data bus lines. A programmable delay element can also be used so that the time delay element 24 is programmed manually (by using jumpers or zero ohm resistors) or under software control.

A binning procedure similar to that described when referring to the RIMM module 10 of FIG. 3 can be used for the motherboard 20 to obtain a desired timing accuracy.

Figure 1:
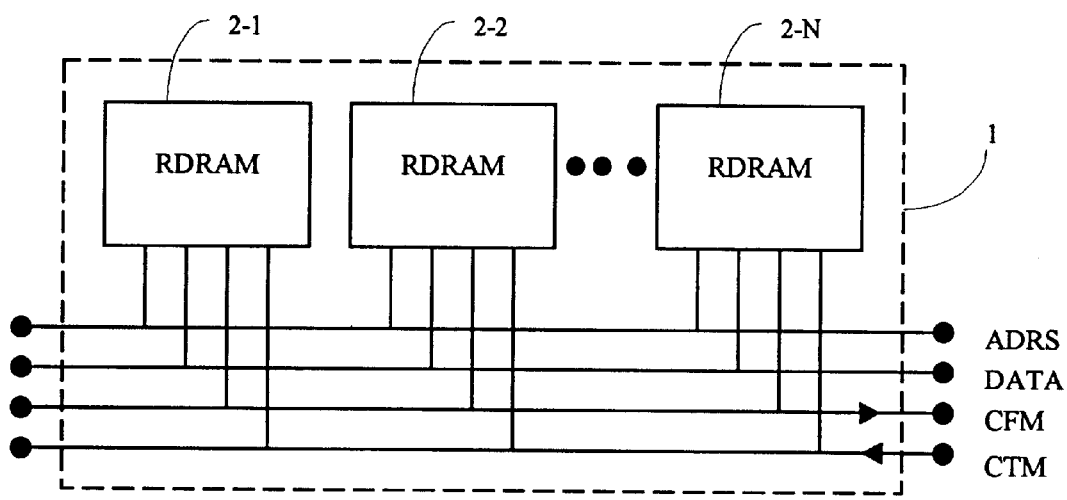
FIG. 1 is a block diagram representing a conventional RIMM memory module comprising a series of RDRAM Rambus memory elements.
Figure 2:
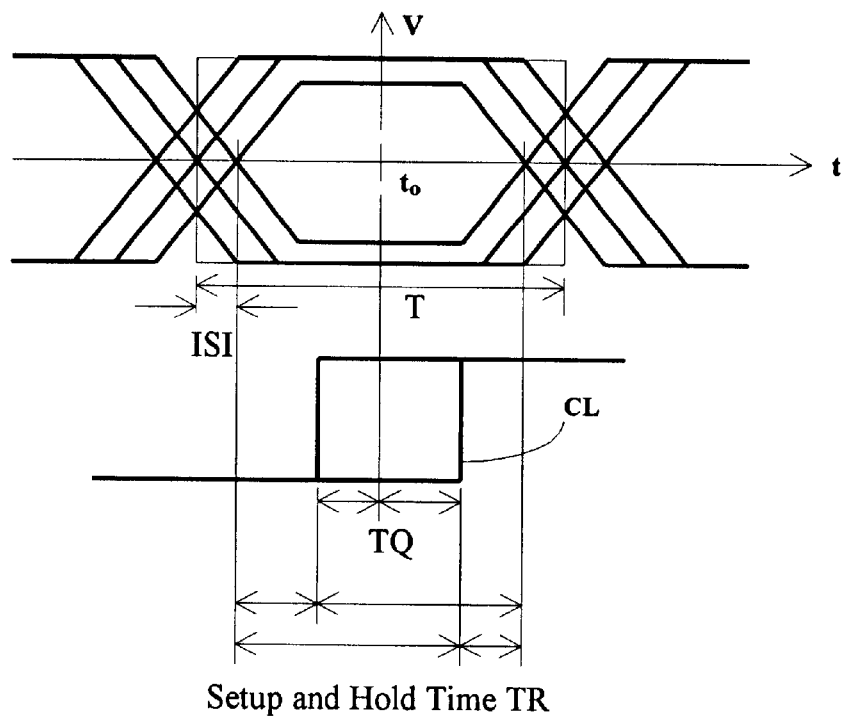
FIG. 2 shows an eye diagram which illustrates the relationship between the data and clock pulses associated with the RIMM memory module of FIG. 1.

It may be appreciated that the Rambus motherboard 20 of FIG. 4 also includes one or more microprocessors (not shown) and peripheral devices (also not shown) by which a variety of different applications can be reliably performed. In this same regard, and by virtue of the reduction in the timing skew TQ between the clock and data pulses, greater timing margins and improved tolerance against error are achieved so that a larger number of RIMM modules 10 can be supported on the Rambus motherboard 20 than would be possible had the conventional RIMM module 1 of FIG. 1 otherwise been used.

I claim:

1. For a RIMM (Rambus Interface Memory Module) having a plurality of synchronously controlled RDRAM memory elements, each of said plurality of RDRAM memory elements coupled to each of an address line to be connected to a memory controller, a data bus line to be connected to the memory controller, and a clock signal path to be connected to the memory controller whereby clock control signals are transmitted between said plurality of RDRAM memory elements and the memory controller, and each of said address line, said data bus line, and said clock signal path are to be respectively connected to the memory controller in electrical series with said RIMM, the improvement comprising time delay means located within said clock signal path so that the timing of said clock control signals transmitted over said clock signal path are adjusted relative to the timing of data signals transmitted over said data bus line so that any error between the timing of said clock control signals and said data signals can be reduced.

2. The improvement recited in claim 1, wherein said clock signal path includes first and second clock lines to be connected to the memory controller, each of the RDRAM memory elements of the RIMM being coupled to the first clock line over which said clock control signals are transmitted from the memory controller and to the second clock line over which said clock control signals are transmitted to the memory controller, said delay means located within said second clock line.

3. The improvement recited in claim 2, wherein said second clock line including said delay means has an input port and an output port to be connected to the controller, said delay means comprising a first module time delay element located at the output port of said second clock line.

4. The improvement recited in claim 3, wherein said first module time delay element at the output port of said second clock line is formed by making said second clock line longer or shorter than said data bus line so as to introduce either a positive or negative time delay to said second clock line.

5. The improvement recited in claim 4, wherein said delay means also comprises a complementary module time delay element relative to said first module time delay element, said complementary module time delay element located at the input port of said second clock line.

6. The improvement recited in claim 5, wherein said complementary module time delay element at the input port of said second clock line is formed by making said second clock line shorter or longer than said data bus line so as to introduce either a negative or a positive time delay to said second clock line provided that the sum of the time delays introduced by said first and complementary module time delay elements equal 0.

7. The improvement recited in claim 6, wherein the plurality of RDRAM memory elements of said RIMM is selected so as to have a substantially identical timing skew between the data signals transmitted over the data bus line and the clock control signals transmitted over said second clock line.

8. The improvement recited in claim 6, wherein said RIMM is located on a printed circuit board having the memory controller to which each of said address line, said data bus line, and said first and second clock lines are connected, said printed circuit board having a system time delay element located within said first clock line.

9. The improvement recited in claim 8, wherein said first clock line having said system time delay element also has an input port to receive said clock control signals from the memory controller and an output port, said system time delay element located at said input port of said first clock line.

10. The improvement recited in claim 9, wherein said first clock line and said data bus line are formed on the printed circuit board by means of electrically conductive traces, said system time delay element being formed by making the size of said first clock line trace longer or shorter than the size of said data bus line trace so as to introduce either a positive or a negative time delay to said first clock line.

11. A synchronously controlled memory system having a plurality of RIMMs (Rambus Interface Memory Modules) interconnected to one another and coupled to each of an address line connected to a memory controller, a data bus line connected to the memory controller, and a clock signal path connected to the memory controller whereby clock control signals are transmitted between said plurality of RIMMs and the memory controller, each of said address line, said data bus line and said clock signal path being respectively connected in electrical series with each of said plurality of RIMMs, and a time delay located between said clock signal path and the memory controller so that the timing of said clock control signals transmitted over said clock signal path are adjusted independently of the timing of data signals transmitted over said data bus line so that any error between the timing of said clock signals and said data signals can be reduced.

12. The synchronously controlled memory system recited in claim 11, wherein said clock signal path includes first and second clock lines connected to the memory controller, each of said plurality of RIMMs coupled to the first clock line over which said clock control signals are transmitted from the memory controller and to the second clock line over which said clock control signals are transmitted to the memory controller, said time delay located within said first clock line.

13. The synchronously controlled memory system recited in claim 11, wherein each of said plurality of RIMMs and the memory controller to which said clock signal path is connected are located on a Rambus motherboard, such that said memory controller is a Rambus chipset.

* * * * *